(12) United States Patent
Aso (10) Patent No.: US 7,228,270 B2
(45) Date of Patent: Jun. 5, 2007

(54) DICTIONARY MANAGEMENT APPARATUS FOR SPEECH CONVERSION

(75) Inventor: Takashi Aso, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/195,373

(22) Filed: Jul. 16, 2002

(65) Prior Publication Data

US 2003/0028369 A1    Feb. 6, 2003

(30) Foreign Application Priority Data

Jul. 23, 2001    (JP) .............................. 2001-221894

(51) Int. Cl.
  *G06F 17/21*    (2006.01)
  *G06F 15/16*    (2006.01)
  *G10L 13/00*    (2006.01)

(52) U.S. Cl. ..................... 704/10; 704/258; 704/260; 709/203; 709/219

(58) Field of Classification Search ............... None
  See application file for complete search history.

(56) References Cited

U.S. PATENT DOCUMENTS

| | | | | |
|---|---|---|---|---|
| 5,404,299 A * | 4/1995 | Tsurubayashi et al. ........ | 704/10 |
| 5,530,645 A * | 6/1996 | Chu ........................... | 715/532 |
| 5,797,116 A * | 8/1998 | Yamada et al. ............... | 704/10 |
| 5,845,047 A | 12/1998 | Fukada et al. ............. | 395/2.77 |
| 6,282,508 B1 * | 8/2001 | Kimura et al. ................ | 701/10 |
| 6,414,610 B1 * | 7/2002 | Smith ......................... | 341/106 |
| 7,155,173 B2 * | 12/2006 | Leung et al. ................. | 455/72 |
| 2001/0012999 A1 * | 8/2001 | Vitale et al. ................ | 704/260 |
| 2004/0210434 A1 * | 10/2004 | Wang et al. .................. | 704/9 |

* cited by examiner

*Primary Examiner*—David Hudspeth
*Assistant Examiner*—Matthew J. Sked
(74) *Attorney, Agent, or Firm*—Fitzpatrick, Cella, Harper & Scinto (57) ABSTRACT

A dictionary management apparatus is disclosed, which can optimize a dictionary required for speech synthesis of character data. The apparatus checks if character data which is to undergo speech conversion includes character data which is not registered in the dictionary. When the unregistered character data is included, the apparatus generates new dictionary data of that character data using another dictionary and adds the generated new dictionary data to the dictionary.

6 Claims, 9 Drawing Sheets

FIG. 2

| CHARACTER STRING | PRONUNCIATION | PART OF SPEECH | TERM OF VALIDITY | OTHER |
|---|---|---|---|---|
| ...... | ...... | ...... | ...... | ...... |
| ...... | ...... | ...... | ...... | ...... |
| know | N OW1 | VERB | — | — |
| job | JH AA1 B | NOUN | ...... | ...... |
| ...... | ...... | ...... | ...... | ...... |

301
```
<add word begin>
    CHARACTER STRING : Kanon
    PRONUNCIATION : K AE1 N AH0 N
    PART OF SPEECH : NOUN
    TERM OF VALIDITY : NONE
<add word end>
```

302
```
<add word begin>
    CHARACTER STRING : IXY
    PRONUNCIATION : I K S IY0
    PART OF SPEECH : PROPER NOUN
    TERM OF VALIDITY : 31/12/2005
<add word end>
```

303
```
<delete word begin>
    CHARACTER STRING : Pythagoras
    PART OF SPEECH : PROPER NOUN (PERSON NAME)
<delete word end>
```

304
```
<original text begin>
    Kanon has released new digital camera "IXY"
<original text end>
```

DICTIONARY MANAGEMENT APPARATUS FOR SPEECH CONVERSION

FIELD OF THE INVENTION

The present invention primarily relates to a technique for converting character data into speech and, more particularly, to a management technique of a dictionary required for speech conversion.

BACKGROUND OF THE INVENTION

A speech synthesis system that converts digital character data has been proposed. In order to convert English text or the like into synthetic speech, language analysis is required to extract information such as pronunciations and the like. The language analysis normally uses a dictionary for language analysis.

However, this dictionary normally includes several ten to thousands of lexical items required to analyze a language such as Japanese or the like, and has a large data size. Hence, when such dictionary is stored on a computer, a memory of several M bytes is required, thus disturbing efficient use of the memory.

On the other hand, the use frequencies of words (so-called trendy words), which reflect ever-changing social situation, become temporarily high, and such words must be registered in the dictionary with high necessity. However, the use frequencies of such words become very low after a given period. If such words are semi-permanently registered in the dictionary, the number of wasteful data increases, and such data cause analysis errors, resulting in analysis precision drop.

SUMMARY OF THE INVENTION

It is a principal object of the present invention to provide a dictionary management technique that can optimize a dictionary required for speech synthesis of character data.

According to the present invention, there is provided a dictionary management apparatus for managing a dictionary used to convert character data into speech, comprising:

means for checking if character data which is to undergo speech conversion includes character data which is not registered in the dictionary;

means for, when the unregistered character data is included, generating new dictionary data of that character data using another dictionary; and means for adding the generated new dictionary data to the dictionary.

According to the present invention, there is also provided a dictionary management apparatus for managing a dictionary used to convert character data into speech, comprising:

means for recording a use frequency of each dictionary data of the dictionary; and means for deleting dictionary data with a low use frequency from the dictionary.

According to the present invention, there is also provided a dictionary management apparatus for managing a dictionary used to convert character data into speech, comprising:

means for setting a term of validity for each dictionary data of the dictionary; and means for deleting expired dictionary data from the dictionary.

According to the present invention, there is also provided a program for managing a dictionary used to convert character data into speech, the program making a computer execute:

the step of checking if character data which is to undergo speech conversion includes character data which is not registered in the dictionary;

the step of generating, when the unregistered character data is included, new dictionary data of that character data using another dictionary; and the step of adding the generated new dictionary data to the dictionary.

According to the present invention, there is also provided a program for managing a dictionary used to convert character data into speech, the program making a computer execute:

the step of recording a use frequency of each dictionary data of the dictionary; and the step of deleting dictionary data with a low use frequency from the dictionary.

According to the present invention, there is also provided a program for managing a dictionary used to convert character data into speech, the program making a computer execute:

the step of setting a term of validity for each dictionary data of the dictionary; and the step of deleting expired dictionary data from the dictionary.

According to the present invention, there is also provided a data providing method for providing character data from a server to a client terminal via a network, the client terminal having a first dictionary used to convert data into speech, and the server having a second dictionary used to convert character data into speech, comprising:

the step of checking by the server if character data to be provided to the client terminal includes character data which is not registered in the second dictionary;

the step of generating, when the unregistered character data is included, new dictionary data of that character data by the server;

the step of generating by the server update data which includes the new dictionary data and an add instruction thereof; and the providing step of providing the generated update data from the server to the client terminal.

According to the present invention, there is also provided a data providing method for providing update data from a server to a client terminal via a network, the client terminal having a first dictionary used to convert data into speech, the server having a second dictionary used to convert character data into speech, and the update data being used to update the first dictionary, comprising:

a term of validity being given to each dictionary data of the second dictionary, the step of extracting expired dictionary data by the server;

the step of generating update data including the extracted dictionary data and a delete instruction thereof by the server; and the providing step of providing the generated update data from the server to the client terminal.

According to the present invention, there is also provided a data providing method for providing update data from a server to a client terminal via a network, the client terminal having a first dictionary used to convert data into speech, the server having a second dictionary used to convert character data into speech, and the update data being used to update the first dictionary, comprising:

the step of recording a use frequency of each dictionary data of the second dictionary by the server;

the step of extracting dictionary data with a low use frequency by the server;

the step of generating update data including the extracted dictionary data and a delete instruction thereof by the server; and the providing step of providing the generated update data from the server to the client terminal.

According to the present invention, there is also provided a server for providing character data to a client terminal, which has a first dictionary used to convert character data into speech, via a network, comprising:

means for storing a second dictionary used to convert character data into speech;

means for checking if character data to be provided to the client terminal includes character data, which is not registered in the second dictionary;

means for, when the unregistered character data is included, generating new dictionary data of that-character data;

means for generating update data which includes the new dictionary data and an add instruction thereof; and means for providing the generated update data to the client terminal.

According to the present invention, there is also provided a server for providing, to a client terminal, which has a first dictionary used to convert character data into speech, via a network, update data used to update the first dictionary, comprising:

means for storing a second dictionary which is used to convert character data into speech, and in which a term of validity is given to each dictionary data;

means for extracting expired dictionary data;

means for generating update data which includes the extracted dictionary data and a delete instruction thereof; and means for providing the generated update data to the client terminal.

According to the present invention, there is also provided a server for providing, to a client terminal, which has a first dictionary used to convert character data into speech, via a network, update data used to update the first dictionary, comprising:

means for storing a second dictionary used to convert character data into speech;

means for recording a use frequency of each dictionary data of the second dictionary;

means for extracting dictionary data with a low use frequency;

means for generating update data which includes the extracted dictionary data and a delete instruction thereof; and means for providing the generated update data to the client terminal.

According to the present invention, there is also provided a program for providing character data to a client terminal, which has a first dictionary used to convert character data into speech, via a network, the program making a computer execute:

the step of checking if character data to be provided to the client terminal includes character data, which is not registered in a second dictionary used to convert character data into speech;

the step of generating, when the unregistered character data is included, new dictionary data of that character data;

the step of generating update data which includes the new dictionary data and an add instruction thereof; and the step of providing the generated update data to the client terminal.

According to the present invention, there is also provided a program for providing, to a client terminal, which has a first dictionary used to convert character data into speech, via a network, update data used to update the first dictionary, the program making a computer execute:

the step of extracting expired dictionary data from a second dictionary which is used to convert character data into speech, and in which a term of validity is given to each dictionary data;

the step of generating update data which includes the extracted dictionary data and a delete instruction thereof; and the step of providing the generated update data to the client terminal.

According to the present invention, there is also provided a program for providing, to a client terminal, which has a first dictionary used to convert character data into speech, via a network, update data used to update the first dictionary, the program making a computer execute:

the step of recording a use frequency of each dictionary data of a second dictionary used to convert character data into speech;

the step of extracting dictionary data with a low use frequency;

the step of generating update data which includes the extracted dictionary data and a delete instruction thereof; and the step of providing the generated update data to the client terminal.

According to the present invention, there is also provided a dictionary management apparatus comprising:

means for storing a dictionary used to convert character data into speech;

means for receiving data which is provided from a server via a network and includes character data;

means for, when the data provided from the server includes update data used to update the dictionary, extracting the update data; and means for updating the dictionary by the extracted update data.

According to the present invention, there is also provided a program that makes a computer execute:

the step of receiving data which is provided from a server via a network and includes character data;

the step of, when the data provided from the server includes update data which is used to update a dictionary used to convert character data into speech, extracting the update data; and the step of updating the dictionary by the extracted update data.

Further objects, features and advantages of the present invention will become apparent from the following detailed description of embodiments of the present invention with reference to the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of dictionary data registered in a dictionary 6a;

FIG. 4 is a flow chart showing a process for deleting expired dictionary data from the dictionary 6a;

DETAILED DESCRIPTION OF THE PREFERRED EMBODIMENTS

Preferred embodiments of the present invention will now be described in detail in accordance with the accompanying drawings.

First Embodiment

Figure 1:
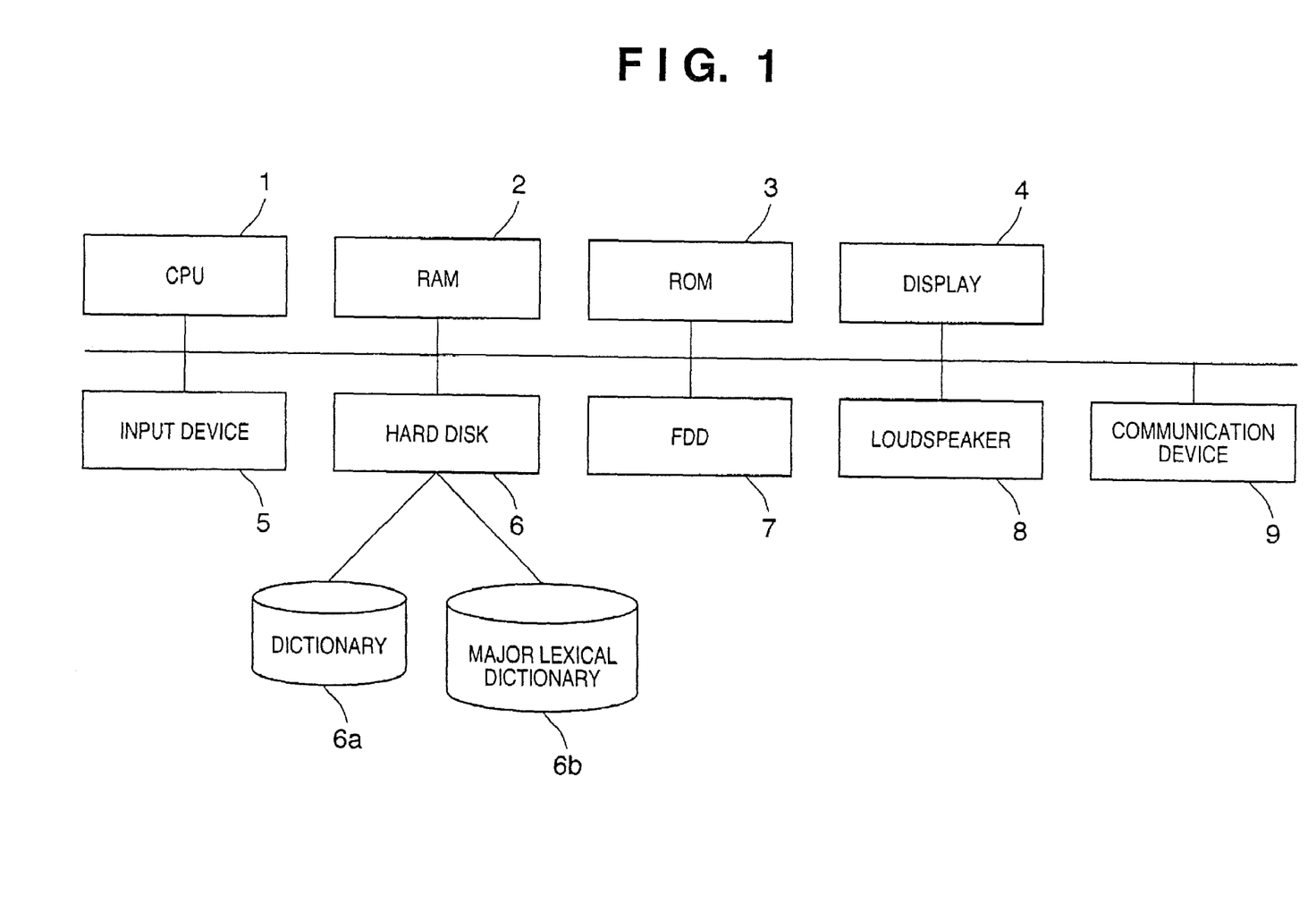
FIG. 1 is a block diagram of a speech synthesis apparatus including a dictionary management function according to an embodiment of the present invention.

FIG. 1 is a block diagram of a speech synthesis apparatus including a dictionary management function according to an embodiment of the present invention. This embodiment will exemplify speech synthesis of Japanese text, but the present invention can be applied to other languages.

The speech synthesis apparatus synthesizes speech of character data, and outputs synthetic speech. This apparatus includes a hardware arrangement as in a general personal computer, i.e., a CPU 1 for executing a dictionary management process (to be described later), and controlling the overall apparatus, a RAM 2, ROM 3, and hard disk 6 for storing data and programs, a display 4 for displaying information, an input device 5 including a keyboard, mouse, and the like, a floppy disk drive (FDD) 7 for reading or writing information from or in a floppy disk, a loudspeaker 8 for outputting speech, and a communication device 9 for communicating with another apparatus via the Internet or the like.

The hard disk 6 stores a dictionary 6a for language analysis used upon speech synthesis of character data, and a major lexical dictionary 6b as another dictionary for language analysis. The dictionary 6a is managed by a dictionary management method of this embodiment, so that its data size is minimized. The major lexical dictionary 6b has a larger data size than the dictionary 6a, and records 500,000 words or more including location names, personal names, and the like. Upon speech synthesis, the dictionary 6a alone is used, and the major lexical dictionary 6b is not used.

Figure 2:
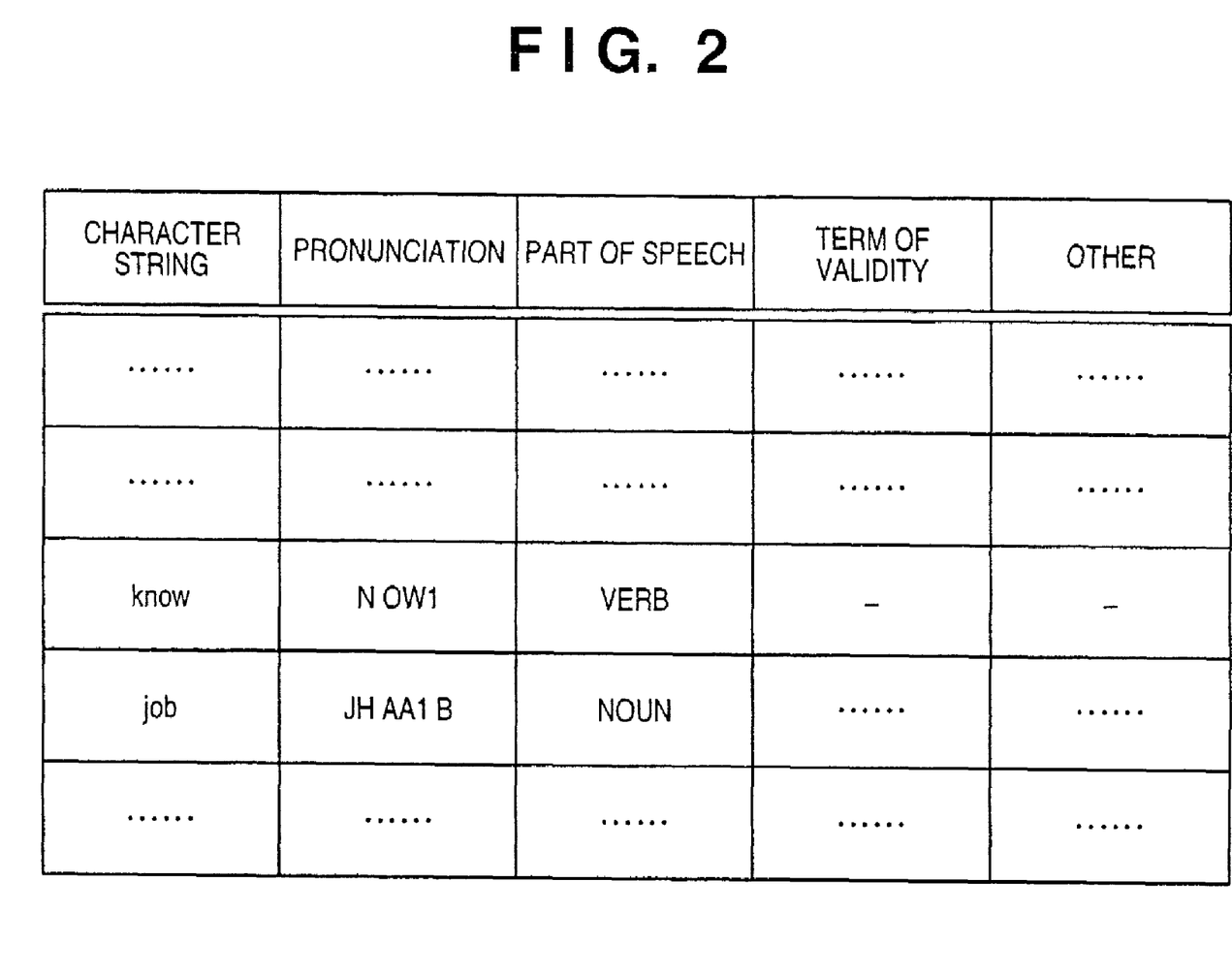

FIG. 2 shows an example of dictionary data registered in the dictionary 6a. As dictionary data, a word spelling, part of speech, term of validity, and miscellaneous information are recorded for respective character strings such as words, idioms, phrases, and the like. The term of validity indicates that of the dictionary data, and expired dictionary data is deleted from the dictionary 6a, as will be described later. A short term of validity is given to dictionary data of a character string such as a trendy word which is considered to have a short life. On the other hand, a long term of validity or no term is given to dictionary data of a character string, which is considered to be used semi-permanently. Each dictionary data registered in the major lexical dictionary 6b has substantially the same format as that shown in FIG. 2, but does not have any term of validity.

Note that these dictionaries 6a and 6b may be stored in other types of storage devices other than the hard disk 6, and may be stored in independent storage devices. Furthermore, these dictionaries may be stored in a storage device outside the apparatus to be able to be acquired.

Figure 3:
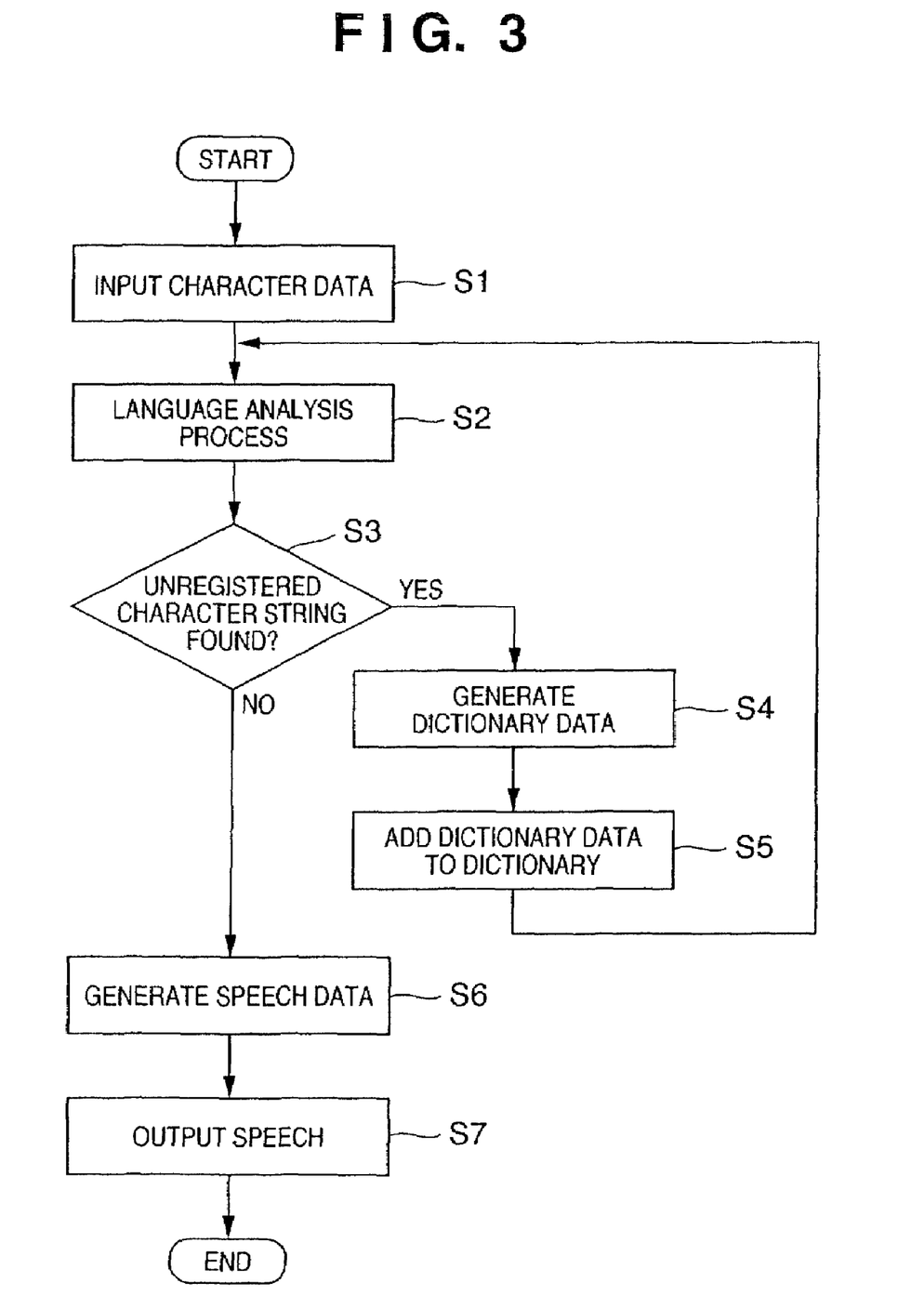
FIG. 3 is a flow chart showing an example of a speech synthesis process by the speech synthesis apparatus shown in FIG. 1.

FIG. 3 is a flow chart showing an example of a speech synthesis process by the speech synthesis apparatus in FIG. 1.

In step S1, character data to be converted into speech is input. Character data may be input by the user from the input device 5, by reading character data stored in a floppy disk by the FDD 7, by acquiring character data on the Internet via the communication device 9, and so forth. In this specification, character data indicates data that roughly represents characters, and is typically text data but also includes document data of wordprocessing software and the like.

In step S2, the input character data undergoes a language analysis process. The language analysis process can adopt a known process that analyzes the pronunciations, accents, and the like of character strings required for speech synthesis. For example, language analysis such as morphological analysis, syntactic analysis, and the like is executed to give the pronunciations, accents, and the like of character strings. In this embodiment, this language analysis process is executed using the dictionary 6a. In this language analysis process, expired dictionary data of those registered in the dictionary 6a may be inhibited from being used.

It is checked in step S3 if the input character data includes a character string not registered in the dictionary 6a. If an unregistered character string is found, the flow advances to step S4; otherwise, the flow advances to step S6.

In step S4, dictionary data of the character string which is not registered in the dictionary 6a is generated. The dictionary data is generated by extracting that of a corresponding word, idiom, or the like using the major lexical dictionary 6b that includes a large number of lexical items. Note that the term of validity of the dictionary data to be generated may be automatically set, or a character string of new dictionary data may be presented to the user via the display 4, and the user may arbitrarily set its term of validity. In step S5, the dictionary data generated in step S4 is added to the dictionary 6a.

In step S6, speech data corresponding to the input character data is generated on the basis of the language analysis result in step S2. When the input character data includes a character string which is not registered in the dictionary 6a, and the processes in steps S4 and S5 are executed, since pronunciation errors and accent errors may be generated if only the processing result in step S2 is used, the language analysis process may be redone to reflect the contents of new dictionary data generated in step S4.

In step S7, speech based on the speech data generated in step S6 is output from the loudspeaker 8.

In this way, in this embodiment, when input character data includes a character string, which is not registered in the dictionary 6a, new dictionary data is generated, and is added to the dictionary 6a. Hence, dictionary data to be used actually can be efficiently registered, a reduction of the data size and prevention of analysis errors can be realized, thus optimizing the dictionary.

Figure 4:
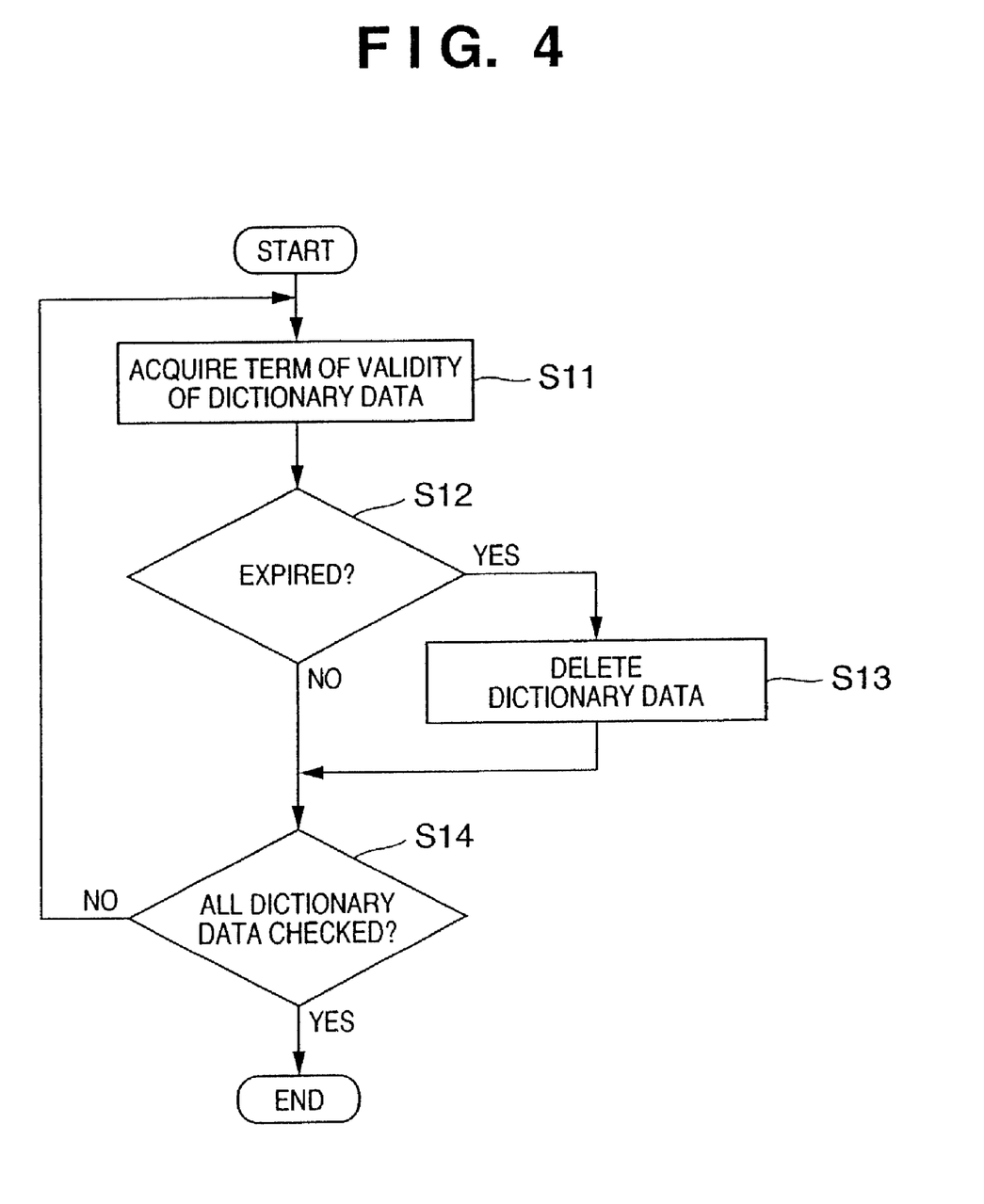

FIG. 4 is a flow chart showing the process for deleting expired dictionary data from the dictionary 6a. This process can be executed when it is periodically and automatically launched.

In step S11, one of dictionary data in the dictionary 6a is selected to acquire its term of validity. It is checked in step S12 if the acquired term of validity has expired, by, e.g., comparing the current date and the term of validity. If the term of validity has expired, the flow advances to step S13, and that dictionary data is deleted from the dictionary 6a. If the term of validity has not expired, the flow advances to step S14.

It is checked in step S14 if these processes are complete for all dictionary data in the dictionary 6a. If NO in step S14, the flow returns to step S11 to process the next dictionary data. In this way, since the term of validity is given to each dictionary data, and the expired dictionary data is deleted from the dictionary 6a, dictionary data of character strings such as trendy words or the like, the use frequencies of which lower every year, can be effectively deleted, and a reduction of the data size and prevention of analysis errors can be realized, thus optimizing the dictionary.

In this embodiment, the term of validity is set for each dictionary data. However, a use frequency may be recorded in place of the term of validity. In this case, the use count of each dictionary data is recorded in the field of term of validity of that dictionary data. Every time given dictionary data is used in the language analysis process in step S2, its use count is incremented. In the language analysis process in step S2 mentioned above, expired dictionary data of those registered in the dictionary 6a may be inhibited from being used. When the use frequency is adopted in place of the term of validity, dictionary data, the use frequency of which is lower than a given threshold value, may be inhibited from being used.

Figure 5:
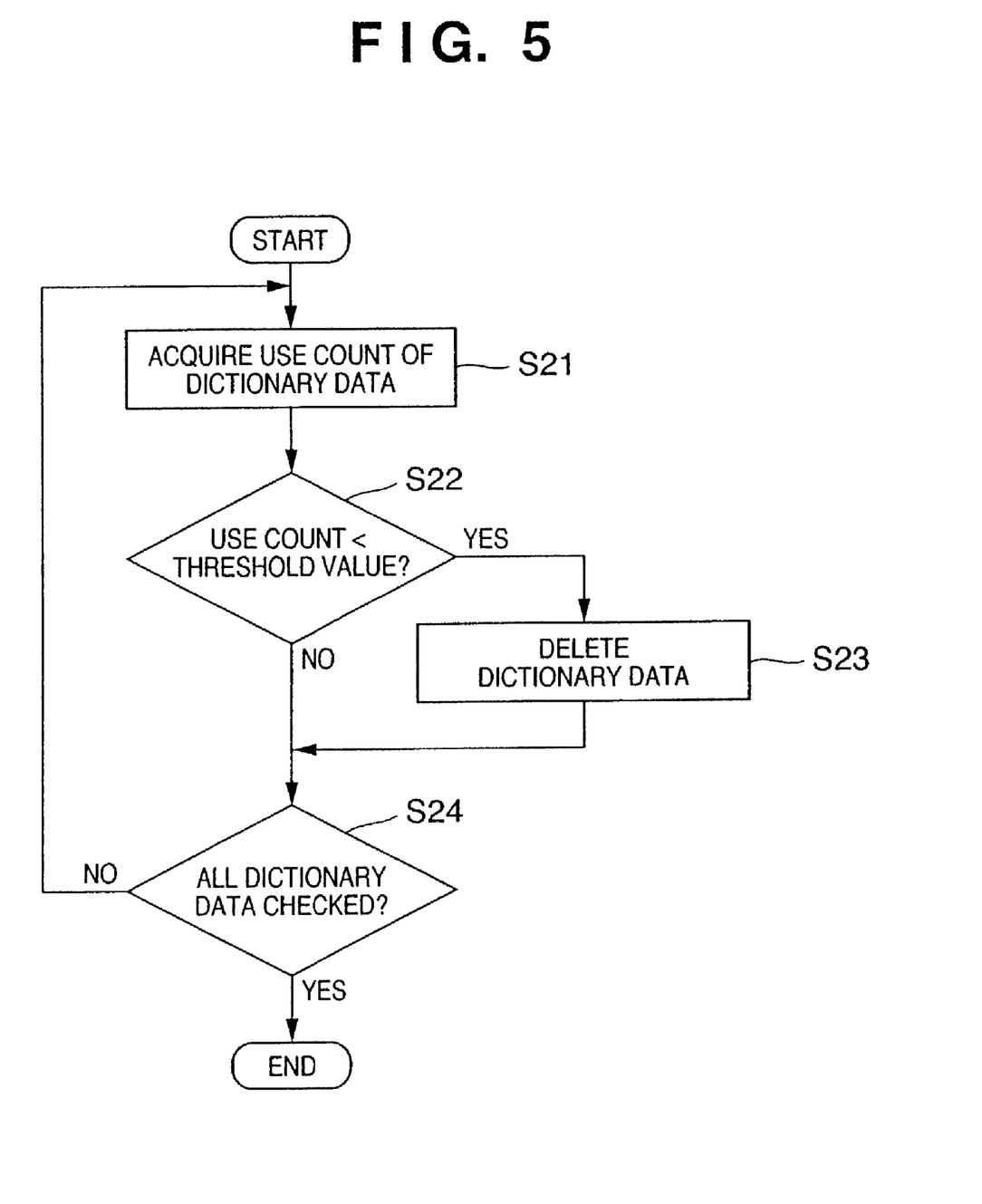
FIG. 5 is a flow chart showing a process when a use count is adopted in place of a term of validity in the delete process of dictionary data shown in FIG. 4.

FIG. 5 is a flow chart when the use count is adopted in place of the term of validity in the dictionary data delete process in FIG. 4.

In step S21, one of dictionary data in the dictionary 6a is selected to acquire its use count. It is checked in step S22 if the acquired use count is smaller than a predetermined threshold value. If YES in step S22, that dictionary data is deleted from the dictionary 6a in step S23. If NO in step S22, the flow advances to step S24.

It is checked in step S24 if these processes are complete for all dictionary data in the dictionary 6a. If NO in step S24, the flow returns to step S21 to process the next dictionary data. In this way, since the use frequency of each dictionary data is recorded, and dictionary data with low use frequency can be efficiently deleted, a reduction of the data size and prevention of analysis errors can be realized, thus optimizing the dictionary.

In this embodiment, the apparatus that executes processes until speech conversion of character data has been explained. However, only a process for updating the dictionary (adding/deleting dictionary data) may be independently formed.

Second Embodiment

Figure 6:
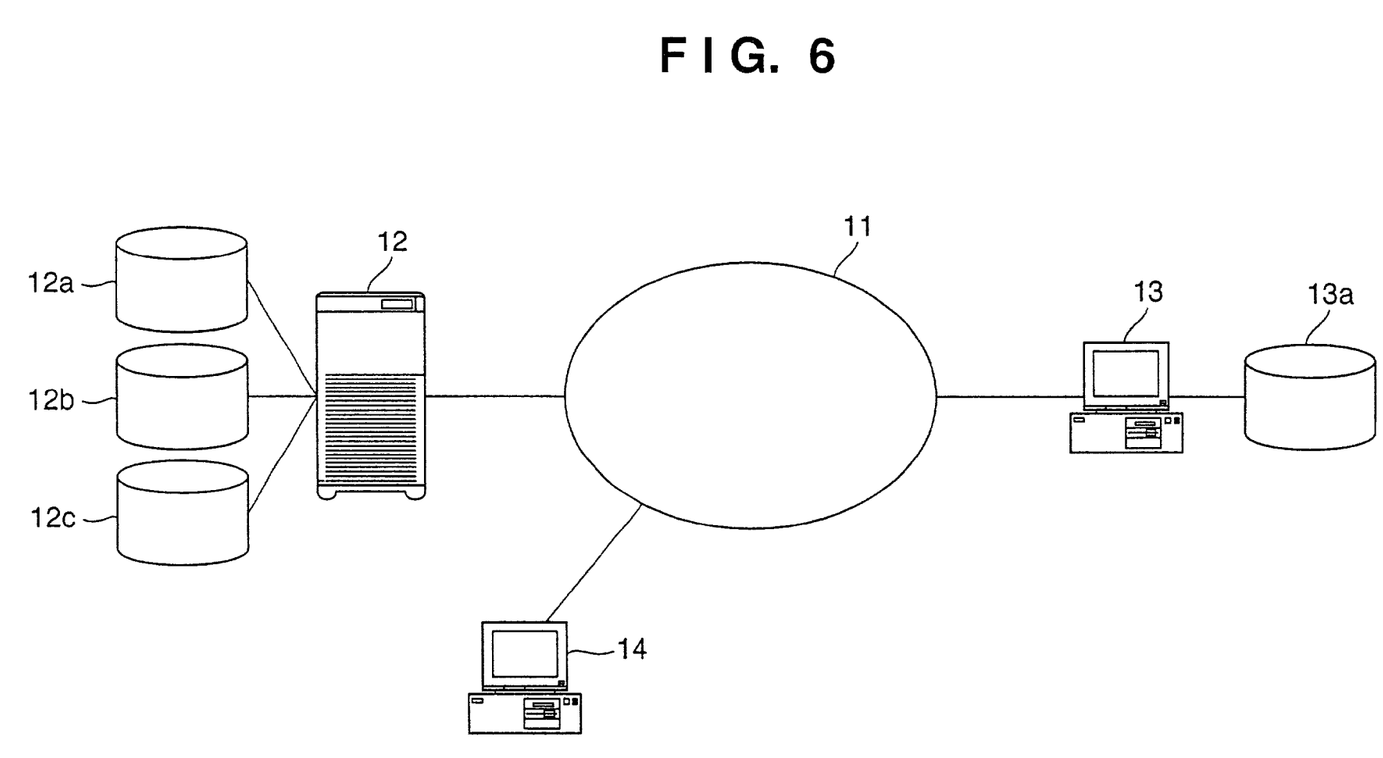
FIG. 6 is a schematic diagram of a network system according to another embodiment of the present invention.

FIG. 6 is a schematic diagram of a network system according to another embodiment of the present invention. In this network system, a server 12 and client computer 13 are connected to a network 11 such as the Internet, LAN, or the like. In the network system of this embodiment, the server 12 provides character data to the client computer 13, and also update data that updates a dictionary of the client computer 13 when the client computer 13 requires new dictionary data to synthesize speech of that character data or when unnecessary dictionary data is generated.

The server 12 delivers, for example, character data of news articles and the like to the client terminal 13, and its hardware arrangement can be equivalent to that of a general server computer.

Character data to be delivered by the server 12 can be stored in the server 12 by uploading the data from, e.g., a client computer 14 connected to the network 11 to the server 12. This embodiment adopts such system. Also, character data may be directly input to the server 12 via a keyboard or the like of the server 12, or character data may be stored in the server 12 via a CD-ROM that records the character data.

The server 12 comprises a dictionary 12a for language analysis required to synthesize speech of character data to be delivered, and a major lexical dictionary 12b as another dictionary for language analysis. These dictionaries 12a and 12b are used not to synthesize speech on the server 12 but to generate update data used to update the dictionary of the client computer 13.

These dictionary 12a and major lexical dictionary 12b correspond to the dictionary 6a and major lexical dictionary 6b shown in FIG. 1, and the major lexical dictionary 12b has a larger data size than the dictionary 12a. In the description of this embodiment, assume that dictionary data in the format shown in FIG. 2 are registered in the dictionary 12a.

Figure 8:
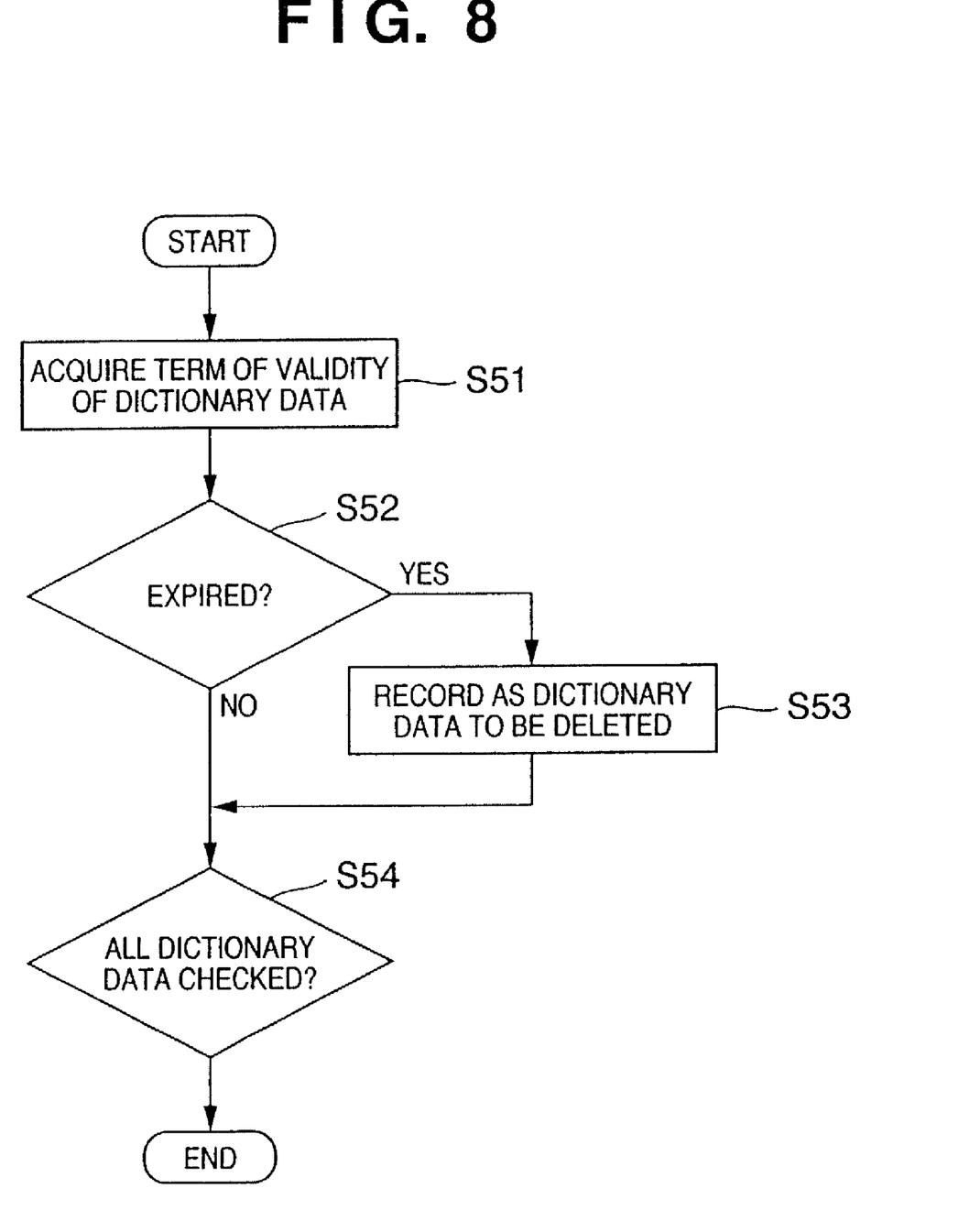
FIG. 8 is a flow chart showing a term of validity check process of dictionary data, which is executed by a server 12.

The server 12 comprises a delete file 12c that stores dictionary data to be deleted from the dictionary 12a. This delete file 12c stores expired dictionary data of those in the dictionary 12a. These processes will be described below with reference to FIG. 8. FIG. 8 is a flow chart showing the term of validity check process of dictionary data, which is executed by the server 12. This process can be executed when it is periodically and automatically launched.

In step S51, one of dictionary data in the dictionary 12a is selected to acquire its term of validity. It is checked in step S52 if the acquired term of validity has expired, by, e.g., comparing the current date and the term of validity. If the term of validity has expired, the flow advances to step S53, and that dictionary data is written in the delete file 12c. If the term of validity has not expired, the flow advances to step S54. It is checked in step S54 if these processes are complete for all dictionary data in the dictionary 12a. If NO in step S54, the flow returns to step S51 to process the next dictionary data.

The reason why the expired dictionary data is stored in the delete file 12c is to generate update data, which is used to update the dictionary of the client computer 13, as will be described later. Note that the use frequency may be recorded in dictionary data in place of the term of validity, as has been described using FIG. 5. In this case, in the process shown in FIG. 8, the process in step S52 may be replaced by step S22 in FIG. 5.

The client computer 13 has a function of receiving character data delivered from the server 12, synthesizing speech of that character data, and outputting speech. The hardware arrangement of the client computer 13 can be the same as that of a general personal computer. For example, the client computer 13 comprises hardware arrangement shown in, e.g., the block diagram of FIG. 1. The client computer 13 comprises a dictionary 13a for language analysis, which is used to execute language analysis of character data delivered from the server 12, and to synthesize speech of that character data. This dictionary 13a has the same dictionary data as those of the dictionary 12a of the server 12 or different dictionary data obtained by updating initial dictionary data, which were the same as those in the dictionary 12a.

The dictionary 13a is stored in the client computer 13 by being downloaded from the server 12 in advance or via a CD-ROM or the like, which is provided by a company that manages delivery of character data from the server 12. FIG. 6 illustrates only one client computer 13. However, a plurality of client computers can be present.

Figure 7:
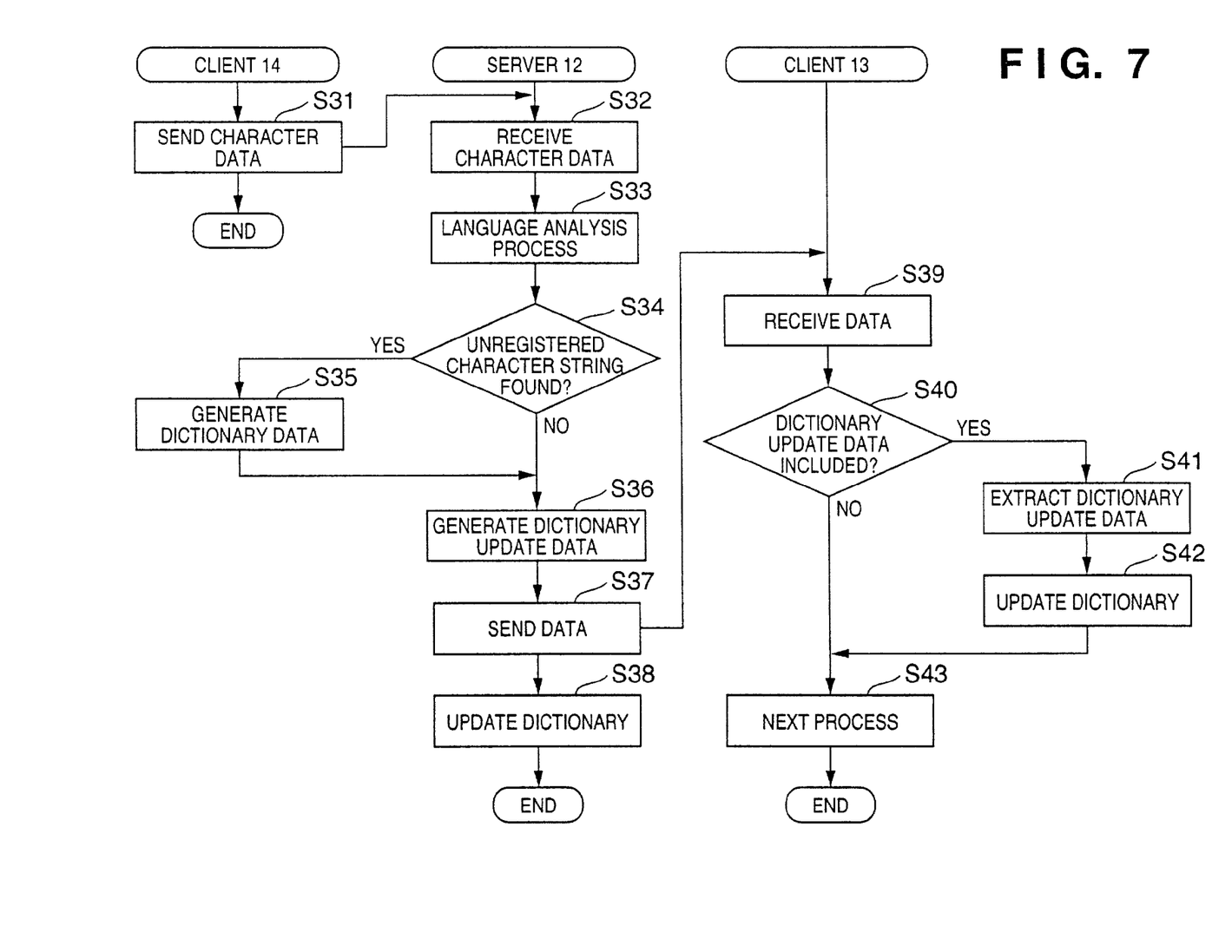
FIG. 7 is a flow chart showing a process executed on the network system shown in FIG. 6.

The process executed on the network system of this embodiment will be described below. FIG. 7 is a flow chart showing that process.

In step S31, the client computer 14 uploads, to the server 12, character data of news articles or the like to be delivered to the client computer 13. In step S32, the server 12 receives character data from the client computer 14, and stores them in a storage device such as a hard disk or the like.

In step S33, the server 12 executes a language analysis process for the received character data. This language analysis process uses only the dictionary 12a but does not use the major lexical dictionary 12b. As the language analysis process, the same process as that described in the process in step S2 described above can be executed. In this case, expired data of those registered in the dictionary 12a (or data whose use frequency is smaller than a predetermined threshold value if the use frequency is adopted) may be inhibited from being used.

It is checked in step S34 if a character string which is not registered in the dictionary 12a is found from the character data in the language analysis process in step S33. If an unregistered character string is found, the flow advances to step S35; otherwise, the flow advances to step S36.

In step S35, dictionary data of that character string, which is not registered in the dictionary 12a, is generated. The dictionary data is generated by extracting that of a corresponding word, idiom, or the like using the major lexical dictionary 12b that includes a large number of lexical items.

In step S36, dictionary update data to be provided to the client computer 13 is generated. The update data includes dictionary data and its add instruction if dictionary data is generated in step S35. Also, if the server 12 finds with reference to the delete file 12c that dictionary data to be deleted is stored in that file, it stores that dictionary data and delete instruction in the update file. That is, difference data of the dictionary 13a is provided to the client as the update data.

Figure 9:
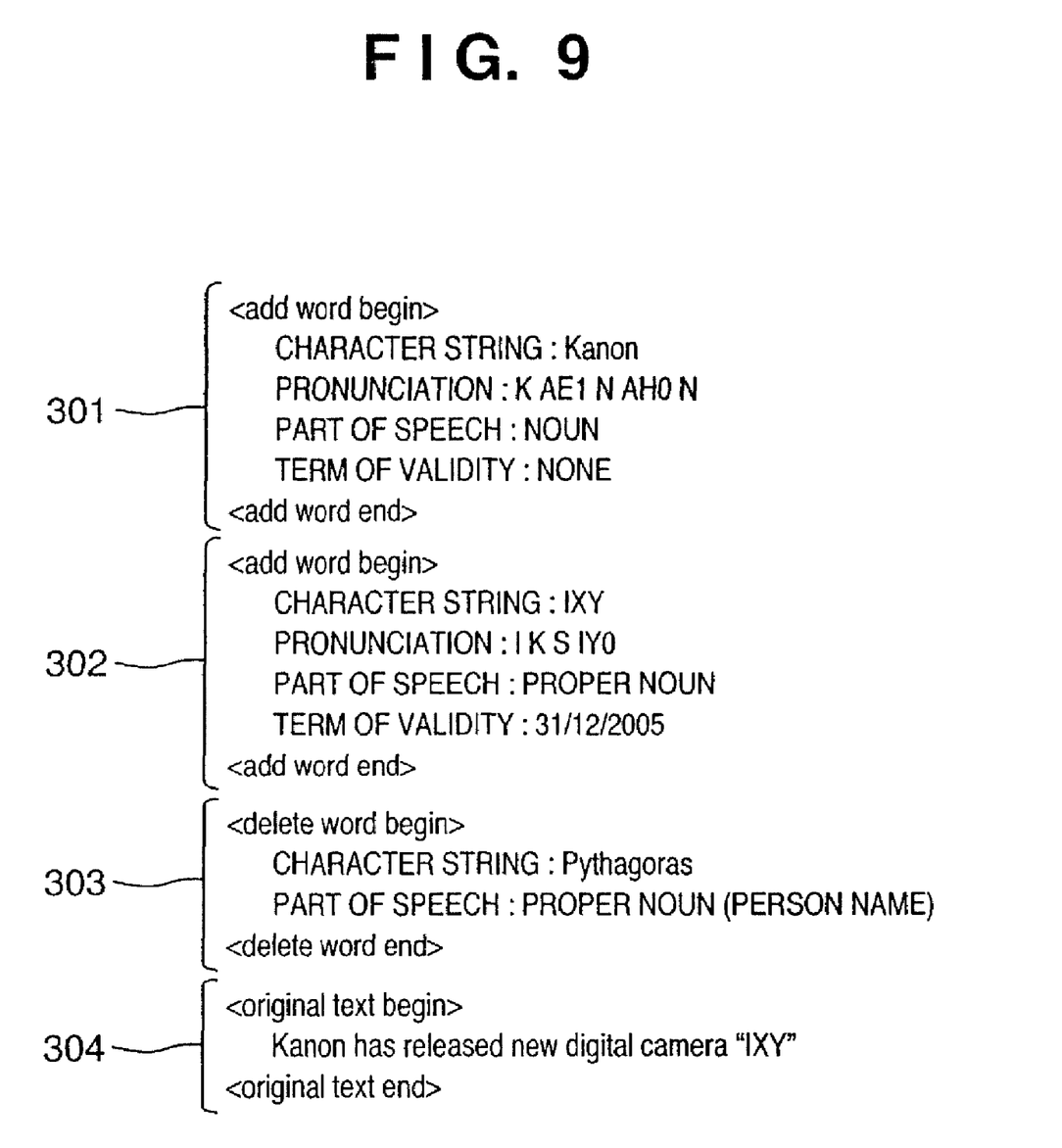
FIG. 9 shows an example of data delivered by the server 12.

In step S37, the data which includes the update data generated in step S36 and the character data received in step S32 is delivered to the client computer 13. FIG. 9 shows an example of data to be delivered. In the data shown in FIG. 9, data 301 and 302 indicate dictionary data to be added to the dictionary 13a of the client computer 13 and their add instructions (<add word begin>). Also, data 303 indicates dictionary data to be deleted and its delete instruction (<delete word begin>). Furthermore, data 304 indicates character data to be delivered.

The server 12 can deliver data via, e.g., an e-mail message. Or data may be delivered when the client computer 13 accesses the server 12.

In step S38, the server 12 updates its own dictionary 12a based on the update data generated in step S36. This is to maintain consistency with the dictionary 13a of the client computer 13.

In step S39, the client computer 13 receives the data from the server 12, and stores it in a storage device such as a hard disk or the like. It is checked in step S40 if the data from the server 12 contains update data of the dictionary (13a). If YES in step S40, the flow advances to step S41; otherwise, the flow advances to step S43.

In step S41, the dictionary update data is extracted from the data received from the server 12 to demultiplex the update data and character data. The update data can be identified by a tag (<add word begin>) in the data shown in FIG. 9. In step S42, the dictionary 13a is updated by the update data extracted in step S41.

In step S43, a process for synthesizing speech of character data from the server 12 using the dictionary 13a, and outputting synthetic speech is executed. of course, after the dictionary is updated, the process may end without any process.

In this manner, in the network system of this embodiment, a reduction of the data size of the dictionary 13a of the client computer 13, and prevention of analysis errors can be realized, thus optimizing the dictionary.

In this embodiment, character data and dictionary update data are delivered simultaneously, but may be sent separately. For example, the update data alone may be sent, and the character data may be sent in response to a request from the client computer 13.

In this embodiment, dictionary data to be deleted is periodically checked (FIG. 8) and is stored in the delete file 12c of the server 12. Upon generating update data in step S36, the stored dictionary data to be deleted is included in the update data. However, in place of periodically checking dictionary data to be deleted, the process shown in FIG. 8 may be executed to extract dictionary data to be deleted upon generating update data in step S36, and if such dictionary data is found, it may be included in the update data. In such case, the delete file 12c can be omitted.

The preferred embodiments of the present invention have been explained. The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As many apparently widely different embodiments of the present invention can be made without departing from the spirit and scope thereof, it is to be understood that the invention is not limited to the specific embodiments thereof except as defined in the claims.

What is claimed is:

1. A dictionary management apparatus for managing a dictionary used to convert text data into speech, comprising:
   means for storing a first dictionary for language analysis;
   means for storing a second dictionary having a larger number of dictionary data than the first dictionary;
   means for obtaining text data;
   means for language analyzing the obtained text data using the first dictionary;
   means for checking if the obtained text data includes a character string which is not registered in the first dictionary on the basis of the language analysis result;
   means for, when an unregistered character string is included, acquiring dictionary data corresponding to that character string from the second dictionary;
   means for adding the acquired dictionary data to the first dictionary; and
   means for generating and outputting speech data on the basis of the language analysis result.

2. A computer readable medium storing a program for managing a dictionary used to convert text data into speech, said program comprising code for performing the following steps:
   a step of obtaining text data;
   a step of language analyzing the obtained text data using a first dictionary for language analysis;
   a step of checking if the obtained text data includes a character string which is not registered in the first dictionary on the basis of the language analysis result;
   a step of acquiring, when an unregistered character string is included, dictionary data corresponding to that character string from a second dictionary having a larger number of dictionary data than the first dictionary;
   a step of adding the acquired dictionary data to the first dictionary; and
   a step of generating and outputting speech data on the bsis of the language analysis result.

3. A data providing method for providing text data from a server to a client terminal via a network, the client terminal having a first dictionary used to convert text data into speech, the server having a second dictionary and a third dictionary having a larger number of dictionary data than the second dictionary, and original dictionary data of the first dictionary being identical to original dictionary data of the second dictionary, said method comprising:
   a step of obtaining text data at the server;
   a step of language analyzing the obtained text data using the second dictionary for language analysis at the server;
   a step of checking at the server if the obtained text data includes a character string which is not registered in the second dictionary on the basis of the language analysis result;
   a step of acquiring, when an unregistered character string is included, dictionary data corresponding to that character string from the third dictionary at the server;
   a step of generating at the server update data which includes the acquired dictionary data and an add instruction thereof; and
   a providing step of providing the generated update data and the obtained text data from the server to the client terminal.

4. A server for providing text data to a client terminal via a network, the client terminal having a first dictionary used to convert text data into speech, the server comprising:
   means for storing a second dictionary original dictionary data of which are identical to original dictionary data of the first dictionary;
   means for storing a third dictionary having a larger number of dictionary data than the second dictionary;
   means for obtaining text data;
   means for language analyzing the obtained text data using the second dictionary;
   means for checking if the obtained text data includes a character string which is not registered in the second dictionary on the basis of the language analysis result;
   means for, when an unregistered character string is included, acquiring dictionary data corresponding to that character string from the third dictionary;
   means for generating update data which includes the acquired dictionary data and an add instruction thereof; and
   means for providing the generated update data and the obtained text data to the client terminal.

5. A computer readable medium storing a program for providing text data to a client terminal via a network, the client terminal having a first dictionary used to convert text data into speech, said program comprising code for performing the following steps:
   a step of obtaining text data;
   a step of language analyzing the obtained text data using a second dictionary for language analysis original dictionary data of which are identical to original dictionary data of the first dictionary;
   a step of checking if the obtained text data includes a character string which is not registered in the second dictionary on the basis of the language analysis result;
   a step of acquiring, when an unregistered character string is included, dictionary data corresponding to that character string from a third dictionary having a larger number of dictionary data than the second dictionary;
   a step of generating update data which includes the acquired dictionary data and an add instruction thereof; and
   a step of providing the generated update data and the obtained text data to the client terminal.

6. A dictionary management method for managing a dictionary used to convert text data into speech, comprising:
   a step of obtaining text data;
   a step of language analyzing the obtained text data using a first dictionary for language analysis;
   a step of checking if the obtained text data includes a character string which is not registered in a first dictionary for language analysis on the basis of the language analysis result;
   a step of acquiring, when an unregistered character string is included, dictionary data corresponding to that character string from a second dictionary having a larger number of dictionary data than the first dictionary;
   a step of adding the acquired dictionary data to the first dictionary; and
   a step of generating and outputting speech data on the basis of the language analysis result.

* * * * *

UNITED STATES PATENT AND TRADEMARK OFFICE
CERTIFICATE OF CORRECTION

PATENT NO. : 7,228,270 B2  Page 1 of 1
APPLICATION NO. : 10/195373
DATED : June 5, 2007
INVENTOR(S) : Takashi Aso It is certified that error appears in the above-identified patent and that said Letters Patent is hereby corrected as shown below:

<u>COLUMN 1</u>
Line 19, "ten" should read --tens--.

<u>COLUMN 3</u>
Line 22, "that-character" should read --that character--.

<u>COLUMN 10</u>
Line 13, "of" should read --Of--.

<u>COLUMN 11</u>
Line 36, "bsis" should read --basis--.

Signed and Sealed this

Third Day of June, 2008

JON W. DUDAS
*Director of the United States Patent and Trademark Office*